July 5, 1949.    N. R. SCHWARTZ    2,475,056
WIRE STRIPPING MACHINE
Filed June 5, 1945
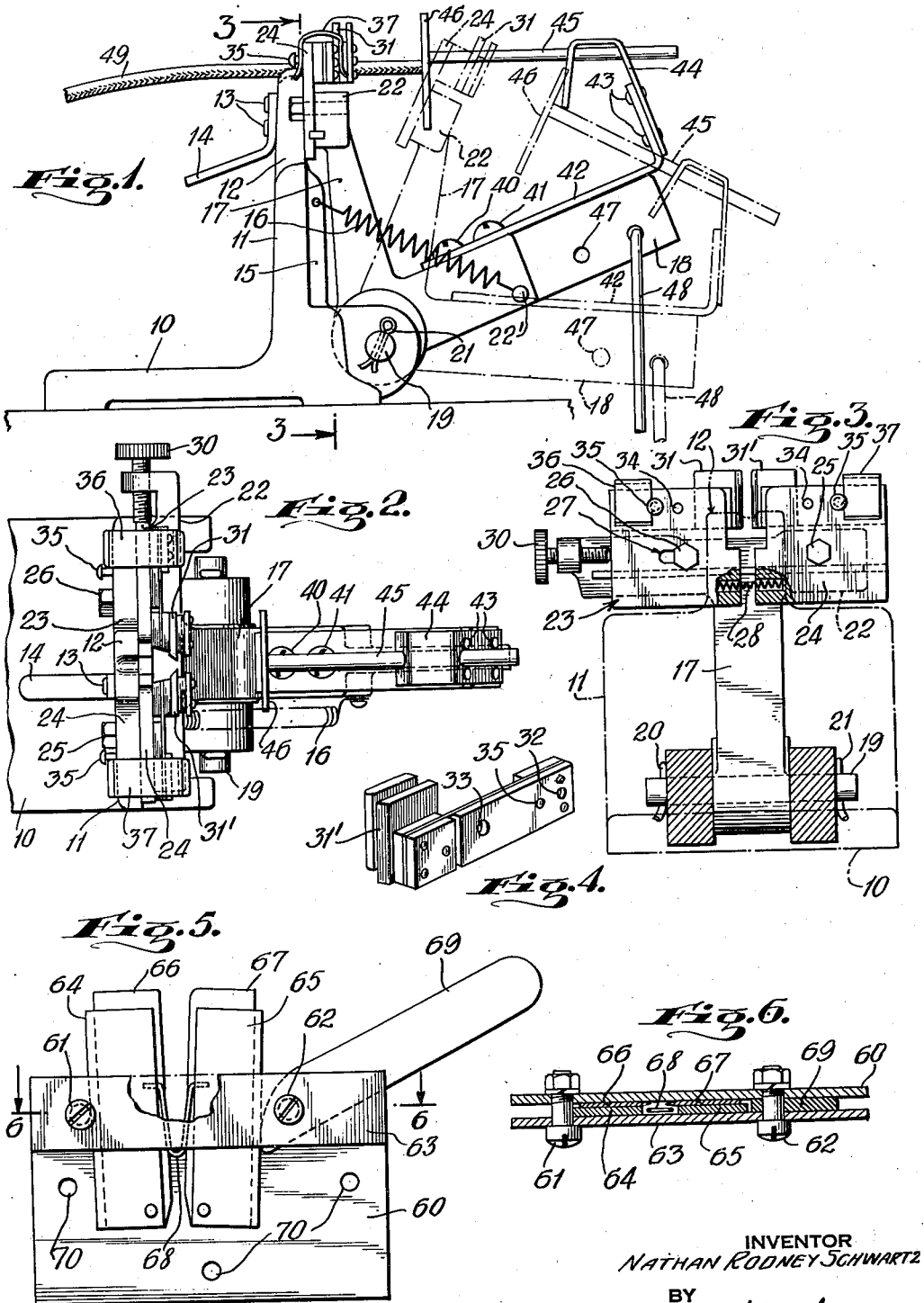
INVENTOR
NATHAN RODNEY SCHWARTZ
BY
ATTORNEY Patented July 5, 1949

2,475,056

UNITED STATES PATENT OFFICE 2,475,056

WIRE STRIPPING MACHINE

Nathan Rodney Schwartz, New York, N. Y., assignor to Saran Research Corporation

Application June 5, 1945, Serial No. 597,641

3 Claims. (Cl. 81—9.51)

This invention relates to wire stripping machines, and more particularly to machines for the partial removal of the insulating cover which commonly encases electrical wires.

As is commonly known, electrical wires and cables are contained in a sheath of rubber, fabric or other material for the purpose of insulation. When it is desired to connect a wire to a terminal it is necessary to remove a portion of the sheath so as to expose the electrical wires.

With this in view, it is the principal object of the present invention to provide a machine for the removal of such sheath, the machine comprising broadly a pair of spaced apart blades, between which the wire to be stripped is entered.

A further object of the present invention resides in the provision of a machine of this character, having anchoring means for the retention of the electrical wire to be stripped, in order to prevent its inadvertent disengagement from the machine during the stripping process.

Yet another aim of the present invention is to provide a machine of this nature, the blades of which may be adjusted towards each other or away from each other, so as to increase or decrease the space between said blades so as to accommodate electrical wires of different diameters.

And another purpose of the present invention lies in the provision of a machine of this kind, the blades of which are removable and interchangeable with other blades, so as to strip virtually all types of electrical wires.

And it is still another aim of the present invention to provide a wire stripping machine of this character, which may be operated by hand, by foot or by electricity, which is very easy to use and to adjust, and which is highly efficient in its use.

These and other meritorious aims and advantages, which will become more fully apparent as the description hereof proceeds, are accomplished by the novel construction, combination and arrangement of parts, hereinafter described, and illustrated in the accompanying drawing, forming a material component of this disclosure, and in which:

Figure 1 is a side elevational view of embodiment of the present invention, the broken lines showing the device in operative or stripping position.

Figure 2 is a partial top view of the device.

Figure 3 is a sectional view of the device, the section being taken on line 3—3 of Figure 1.

Figure 4 is a perspective view of one of the blades used in connection with the machine.

Figure 5 is a front elevational view of a modified form of wire stripping machine; and Figure 6 is a sectional view of the same, the section being taken on line 6—6 of Figure 5.

Referring in greater detail to the drawing, the numeral 10 designates in general a foot member 16 having integrally formed therewith at its rear end and at right angle thereto an upright 11.

At the upper edge of said upright 11 and midways thereof, there may be provided an upwardly extending extension 12, to which may be secured by rivets 13 or otherwise, an anchor 14, the purpose of which will become more fully apparent as the description hereof proceeds.

At each side of said extension 12, the upright 11 has integrally formed a narrow vertical projection 15, the upper end of which is provided with an aperture, to which is secured one end of compression spring 16.

The device further comprises a member having two arms 17—18, spaced substantially 90 degrees apart, said arms 17—18 being pivotally secured at their angle to the rear of upright 11 near the base thereof, the junction being made by means of pivot pin 19, said pin 19 having a vertical opening near each end thereof, through which pass stays 20 and 21 respectively to prevent the disengagement of said pin 19 from the device.

A rivet 22' is positioned near the center of arm 18 to which is anchored the other end of compression spring 16, normally drawing arm 17 against the back of upright 11, as illustrated in solid lines in Figure 1 of the drawing.

At its upper end, arm 17 has integrally formed therewith a head 22, to each of the arms of which, at their outer faces, is secured a substantially square plate 23 and 24 resceptively, said plates 23 and 24 being spaced apart, their distance being slightly less than the width of projection 12. Member 24 is rigidly retained against the corresponding arm of member 22 by screw 25, while 23 is secured to the corresponding arm slidably by means of screw 26 in slot 27. Near the base of said plate, spring 28, retained in holes provided for that purpose in each plate member tends to force plate 23 against a micrometer screw 30, which permits adjustment of the plate 23 whereby the relative distance between members 23 and 24 can be increased or decreased. This is illustrated in Figures 2 and 3 of the drawing.

Seating on the upper edge of member 22 and positioned directly behind plates 23 and 24 are a pair of blades 31—31', their cutting edges facing each other and extending into the space between members 23 and 24. At their rear, members 23 and 24 are each provided with two projections 34 adapted to be entered into openings 32—33 in the blade member, and there is also provided in each of said members 23 and 24 a slidable knock-out rivet 35. In its inoperative position, knock-out rivet 35 rests against each of said blades, but does not enter any opening in said blades. Pressure against the head of said rivet causes the stem thereof to press against each of said blades, facilitating their removal. Members 23 and 24 respectively and the corresponding blade members 31—31' are joined by a pair of spring clamps 36 and 37.

Superimposed upon arm 18 and retained thereon by screws 40—41 is a bar 42 extending rearwardly the length of arm 18 where it is bent upwardly at 90 degrees. At its bend, bar 42 has secured thereto by means of rivet 43 or the like, an extension 44, which extends beyond the termination of the bend of bar 42, whence it is bent forwardly and downwardly as illustrated in Figure 1. A pair of openings are provided through the upreaching and the downwardly extending portions of extension 44, for the slidable retention of a rod 45, said rod terminating in a buffer 46. Rod 45 is retained in any adjusted position because of the spring-like quality of the downreaching portion of extension 45. In order to free the rod for slidable movement, the downreaching member is pressed rearwardly. Release of pressure will again lock the rod. Near its under side, arm 18 may be provided with one or more openings 47, through which may pass means, such as cable 48 connecting it to a foot pedal, electric motor or hand lever. Figure 1 further illustrates an electrical wire entered between the blades for the purpose of stripping. This wire is identified by the numeral 49.

The modification illustrated in Figures 5 and 6 comprises a plate member 60, substantially rectangular in cross-section, the upper edge of which has spacedly secured thereto by screws 61—62 a horizontal bar 63. Clamped between plate 60 and bar 63 are a pair of vertical, spaced-apart uprights 64—65, each of which having secured at its upper end a cutting blade identified by the numerals 66 and 67 respectively, their cutting edges extending slightly into the space between uprights 64 and 65, the said cutting edges facing each other. At the lower edge of bar 63, uprights 64 and 65 are joined by spring wire 68. A hand lever 69 is pivotally retained by screw 62 between bar 63 and plate 60 for a purpose to be further explained forthwith.

Plate 60 may be provided with one or more openings 70 for the passage of means therethrough for securing the device to a support.

The device illustrated in Figures 1–4 inclusive operates in the following manner. When it is desired to strip a portion of insulating cover from an electrical cable, the said cable is entered up to the point to be stripped into the machine between the cutting blades, as illustrated in Figure 1. When the anchor illustrated in the drawing is to be used, the free end of the cable is wound about the anchor, so as to retain it firmly against upright 11. The device is then actuated by a foot pedal, electric motor or in any other desirable way, whereupon the rear portion of the device will move backwardly, to the point illustrated in Figure 1, stripping the wire in an obvious manner. The end of the wire to be stripped will rest against buffer 46, which may be slid backward or forward depending upon the length of the wire to be stripped.

Only one type of cutting blade is here illustrated but different blades, that is, blades of different thicknesses may be employed either in pairs or in combination of pairs, depending upon the nature of the wire to be stripped.

When it is desired to increase or decrease the distance between the blades, to accommodate wires of different diameters, micrometer screw 30 may be turned to the right or to the left in an obvious manner. Knock-out rivets 35 and 36 are provided. A slight tap against these rivets will cause the blades to become disengaged, but prior thereto, of course, clamps 36 and 37 must be removed.

Some cables to be stripped are rather thick, and cannot easily be wound about the anchor here illustrated. Where such contingency arises, a different kind of retaining means will of necessity be employed. The kind here preferably used would be the device illustrated in Figure 5 without cutting blades 66—67. The cable to be stripped would be retained between uprights 64—65, their distance to be adjusted by manipulating the hand lever 69 in an obvious manner.

When the modified form of stripping machine is used, as illustrated in Figures 5 and 6, the wire to be stripped is placed between the blades 66 and 67, which, by manipulation of lever 69 will bite into the cover to be removed. The wire is then drawn towards the operator, and the cover will be removed.

Many other modifications will become apparent as the device is used but, for purpose of illustration, there has here been presented a simple and effective wire stripping machine in its principal form and one modification. This disclosure however, is to be regarded as illustrative and descriptive only of the best known embodiments of the invention, and not as limitative or restrictive to the exact details shown, applicant reserving the right to make such changes in the device as may come within the scope of the appended claims, without thereby departing from the spirit of this invention.

Having thus described the invention, what is claimed as new and desired to secure by Letters Patent, is:

1. A wire stripping machine comprising a base, an upright integral therewith, said upright terminating centrally thereof in a vertical extension, a rectangular arm, said arm pivotally secured at its elbow to said base, means joining said upright and said arm normally urging said arm against said upright, said arm terminating at its upper end in a pair of spaced apart outstretched elements, a pair of rectangular plates, each of said plates secured to one of said outstretched elements, a pair of blades, each of said blades secured to one of said plates, means slidably mounted in said plates facilitating the removal of said blades, means embracing the upper edges of said blades and said plates retaining said blades and said plates in operative engagement, means at the end of one of said outstretched elements for adjusting the relative distance between said plates, and a buffer slidably secured to the other end of said arm and engaging the free end of an electrical wire to be stripped.

2. A wire stripping machine comprising a base, an upright integral therewith, said upright terminating centrally thereof in a vertical extension, an anchor, said anchor secured to said extension, a right-angular arm, said arm pivotally secured at its elbow to said base, an opening in said upright, a compression spring, one end of said spring secured in said opening, the other end of said spring secured to said arm normally urging said arm against said upright, said arm terminating at its upper end in a pair of opposedly outstretched elements, a pair of rectangular plates, each of said plates secured to one of said outstretched elements in spaced relation to each other, a pair of blades, each of said blades removably secured to one of said plates, a plurality of projections on the inner face of each of said plates, corresponding apertures in said blade members to receive said projections, means slidably mounted in each of said plates facilitating the removal of said blades, a pair of spring clamps, each of said spring clamps embracing the upper edges of one of said blade elements and the corresponding plate, removably retaining them in engagement, means at the end of one of said outstretched elements for adjusting the relative distance between said plates, and a buffer slidably secured to the other end of said arm and engaging the free end of an electrical wire to be stripped.

3. In a wire stripping machine, a base, an upright integral therewith, said upright terminating centrally thereof in a vertical extension, an anchor comprising an angularly bent bar, one of the ends of said anchor secured to said extension, a rightangular arm, said arm pivotally secured at its elbow to said base, a tension spring, means on said upright receiving one end of said spring, means on said arm receiving the other end of said spring, said arm terminating at its upper end in a pair of opposedly outstretched elements, a pair of rectangular plates, each of said plates secured to one of said outstretched elements in spaced relation to each other, a pair of blade members, each of said blade members removably secured to one of said plates, a plurality of projections on each of said plates, a plurality of openings in each of said blade members receiving said projections, a slidable pin in each of said plates facilitating the removal of said blade members, a pair of clamps, each of said clamps embracing one of said plates and one of said blade members retaining them in operative engagement, means at the end of one of said outstretched elements adjusting the relative distance between said plates, and a buffer slidably secured to the other end of said arm and engaging the free end of an electrical wire to be stripped.

NATHAN RODNEY SCHWARTZ.

REFERENCES CITED

The following references are of record in the file of this patent:

UNITED STATES PATENTS

| Number | Name | Date |
| --- | --- | --- |
| 1,618,734 | Smitak | Feb. 22, 1927 |
| 1,661,180 | Johnson | Mar. 6, 1928 |
| 1,867,712 | Reitzig | July 19, 1932 |
| 1,902,742 | Wentink | Mar. 21, 1933 |
| 1,998,391 | Shaw | Apr. 16, 1935 |
| 2,179,581 | Voogd | Nov. 14, 1939 |
| 2,285,167 | Montgomery | June 2, 1942 |
| 2,313,793 | Wood | Mar. 16, 1943 |

FOREIGN PATENTS

| Number | Country | Date |
| --- | --- | --- |
| 77,583 | Sweden | June 20, 1933 |